United States Patent
Fawcett et al.

(10) Patent No.: US 10,720,292 B2
(45) Date of Patent: Jul. 21, 2020

(54) OR RELATING TO DIGITAL OUTPUT CIRCUITS

(71) Applicant: General Electric Technology GmbH, Baden (CH)

(72) Inventors: Timothy James Fawcett, Yoxall (GB); Mark Draper, Stafford (GB); Antoine Garcia, Marsillargues (FR)

(73) Assignee: General Electric Technology GmbH, Baden (CH)

( * ) Notice: Subject to any disclaimer, the term of this patent is extended or adjusted under 35 U.S.C. 154(b) by 387 days.

(21) Appl. No.: 15/553,230

(22) PCT Filed: Feb. 23, 2016

(86) PCT No.: PCT/EP2016/053744
§ 371 (c)(1),
(2) Date: Aug. 24, 2017

(87) PCT Pub. No.: WO2016/135126
PCT Pub. Date: Sep. 1, 2016

(65) Prior Publication Data
US 2018/0240628 A1    Aug. 23, 2018

(30) Foreign Application Priority Data

Feb. 25, 2015   (EP) .................................... 15275052

(51) Int. Cl.
*H01H 47/00*    (2006.01)
*H01H 9/54*    (2006.01)
(Continued)

(52) U.S. Cl.
CPC .......... *H01H 47/002* (2013.01); *H01H 9/541* (2013.01); *H02H 3/044* (2013.01);
(Continued)

(58) Field of Classification Search
None
See application file for complete search history.

(56) References Cited

U.S. PATENT DOCUMENTS

| 5,136,458 A | 8/1992 | Durivage, III |
|---|---|---|
| 5,636,134 A | 6/1997 | Johnson et al. |

(Continued)

FOREIGN PATENT DOCUMENTS

| CN | 101194217 A | 6/2008 |
|---|---|---|
| CN | 101647167 A | 2/2010 |

(Continued)

OTHER PUBLICATIONS

International Search Report and Written Opinion issued in connection with corresponding PCT Application No. PCT/EP2016/053744 dated May 10, 2016.

(Continued)

*Primary Examiner* — Stephen W Jackson
(74) *Attorney, Agent, or Firm* — Eversheds Sutherland (US) LLP

(57) ABSTRACT

In the field of power distribution networks, a digital output circuit, for controlling an item of equipment within a power distribution network, comprises a switch element openable and closeable to selectively permit the flow of current to an item of equipment being controlled in use by the digital output circuit. The digital output circuit also includes a current acquisition circuit to measure the current flowing through the switch element. In addition, the digital output circuit includes a condition monitoring circuit that is arranged in communication with the current acquisition circuit. The condition monitoring circuit is configured to record the measured current flowing through the switch element as the switch element closes and thereby establish a switch element closing signature.

10 Claims, 1 Drawing Sheet

(51) Int. Cl.
  *H02H 3/50*  (2006.01)
  *H02H 3/04*  (2006.01)
  *H02H 7/22*  (2006.01)
  *H01H 71/12*  (2006.01)

(52) U.S. Cl.
  CPC .............. *H02H 3/50* (2013.01); *H02H 7/222* (2013.01); *H01H 2071/124* (2013.01)

(56) References Cited

U.S. PATENT DOCUMENTS

| | | | |
|---|---|---|---|
| 6,148,263 A * | 11/2000 | Brooks | G05B 23/0256 |
| | | | 702/6 |
| 6,635,974 B1 * | 10/2003 | Karuppana | H02J 1/14 |
| | | | 307/10.1 |
| 7,154,381 B2 * | 12/2006 | Lang | G06F 1/266 |
| | | | 340/12.32 |
| 7,177,125 B2 | 2/2007 | Lazarovich et al. | |
| 2004/0156154 A1 | 8/2004 | Lazarovich et al. | |

FOREIGN PATENT DOCUMENTS

| | | |
|---|---|---|
| CN | 103138228 A | 6/2013 |
| EP | 0 718 948 A2 | 6/1996 |
| WO | 99/42845 A1 | 8/1999 |

OTHER PUBLICATIONS

Machine Translation and First Office Action and Search issued in connection with corresponding CN Application No. 201680012322.5 dated Jul. 4, 2018.

* cited by examiner

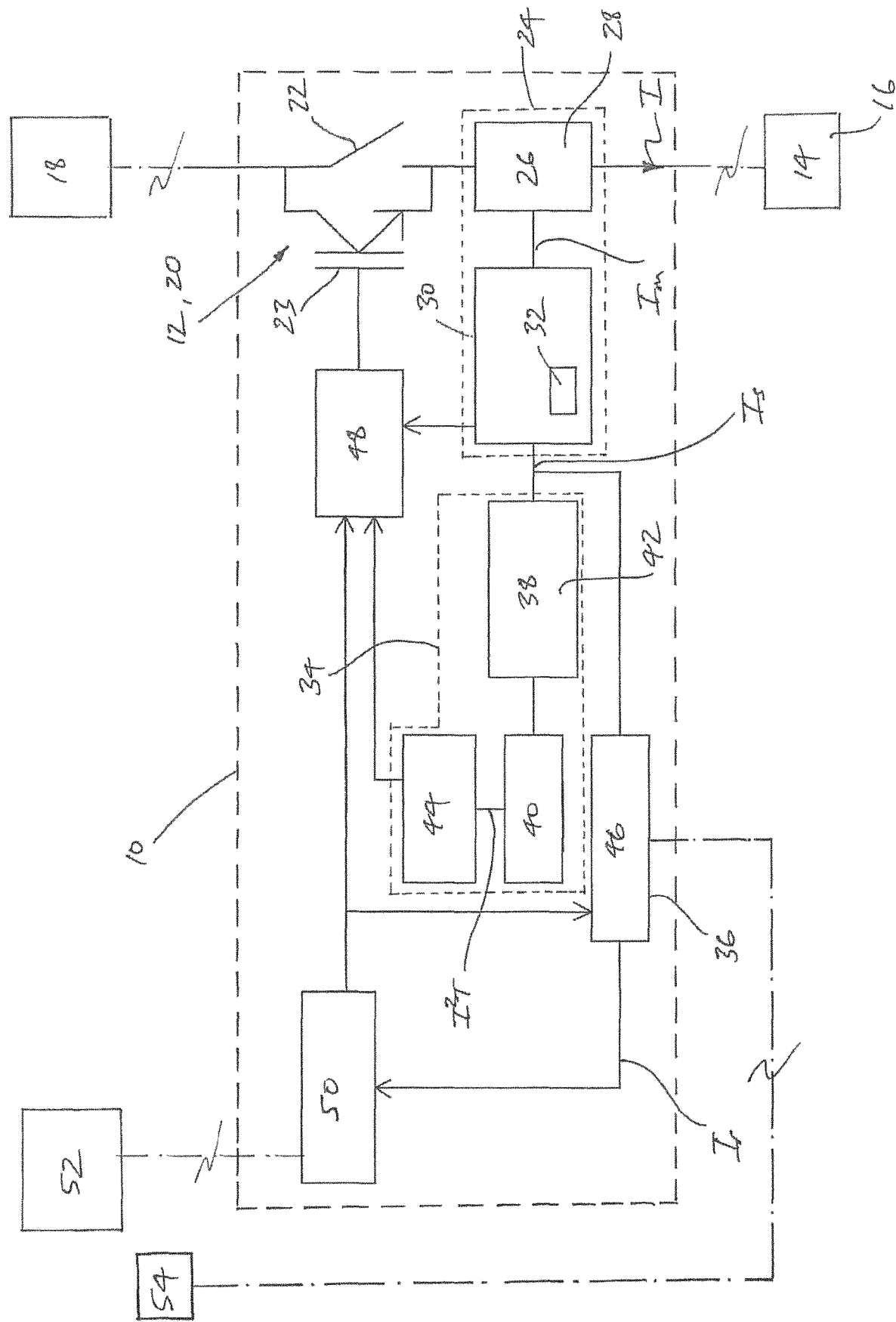

OR RELATING TO DIGITAL OUTPUT CIRCUITS

FIELD OF INVENTION

Embodiments of the invention generally relate to the field of digital output circuits.

BACKGROUND OF THE INVENTION

In power distribution networks, the control of individual items of equipment, e.g. plant items or other loads, is handled by respective digital outputs. Each such digital output typically takes the form of a switch element, which is openable and closeable to selectively permit the flow of current, e.g. from a power supply, to the item of equipment in order that the item of equipment may operate.

Each switch element may be a relay contact or a so-called high-speed high-break contact that typically consists of a relay contact arranged in parallel with an electronic switching element, such as a semiconductor switching element in the form of transistor.

BRIEF DESCRIPTION

According to an aspect of an embodiment of the invention, there is provided a digital output circuit, for controlling an item of equipment within a power distribution network, comprising: a switch element openable and closeable to selectively permit the flow of current to an item of equipment being controlled in use by the digital output circuit; a current acquisition circuit to measure the current flowing through the switch element; and a condition monitoring circuit arranged in communication with the current acquisition circuit, the condition monitoring circuit being configured to record the measured current flowing through the switch element as the switch element closes and thereby establish a switch element closing signature.

The inclusion of a condition monitoring circuit permits the performance and any degradation of an equipment item being controlled by the digital output circuit to be monitored. This allows predictive maintenance to be scheduled and/or incipient faults to be detected before correct operation of the equipment item is adversely affected.

Moreover, such condition monitoring is provided without the need for costly external monitoring apparatus that is difficult to integrate into the rest of an overall control system.

In another embodiment of the present invention, the switch element closing signature is indicative of particular performance traits of the equipment item being controlled and thereby permits the identification of a problem with the equipment item.

The ability to identify a potential problem with the equipment item being controlled solely from the switch element closing signature is extremely beneficial as it can allow for pre-emptive maintenance or repair to be carried out.

Optionally, the condition monitoring circuit is arranged in communication additionally with a closing signature assessment unit configured to compare the switch element closing signature with a known reference signature and to indicate based on the comparison when there is a particular problem with the equipment item.

Such an arrangement provides for the timely, accurate, and repeatable identification of a problem with the equipment item being controlled.

In yet another embodiment of the invention, the closing signature assessment unit is configured to indicate that there is a particular problem with the equipment item when the switch element closing signature deviates to a predetermined extent from the reference signature.

Having the closing signature assessment unit so configured provides the option of ignoring minor deviations from the reference signature and so helps to reduce the likelihood of there being erroneous indications of a problem with the equipment item.

In a further embodiment of the invention, the condition monitoring circuit includes a buffer to record the measured current flowing through the switch element.

The inclusion of such a buffer provides a convenient and compact way of recording measured current samples provided by the current acquisition circuit.

The buffer may be configured to transmit recorded measured current samples to the closing signature assessment unit.

Such an arrangement permits an assessment of any degradation of the equipment item being controlled by the digital output circuit to be made, and thereby helps to identify possible problems with the equipment item such as increased contact resistance, mechanical wear, contamination and/or electrical defects.

A user or some automated system may then make a recommendation to, e.g. schedule maintenance of the equipment item or take the equipment item out of service for emergency repairs.

In an embodiment of the present invention, the buffer empties when the switch element opens.

Such a buffer allows for a re-arming of the condition monitoring circuit for the next occasion when the switch element closes, so as to again provide the desired condition monitoring of the equipment item at that time.

In another embodiment of the invention, the current acquisition circuit includes a current sensor.

Such a current sensor is able accurately and reliably to measure the current flowing through the switch element.

Optionally, the current acquisition circuit additionally includes a conditioning module to filter and amplify measured current provided by the current sensor.

The conditioning module in an embodiment of the present invention, includes an analogue to digital converter to convert the measured current into individual measured current samples.

The inclusion of such features desirably provides measured current samples that are suitable for downstream processing.

In another embodiment of the present invention, the current acquisition circuit includes a secondary protection circuit configured to initiate opening of the switch element when the measured current flowing through the switch element exceeds a specified limit.

The inclusion of a secondary protection circuit within the current acquisition circuit provides for instant protection of both the switch element and the equipment item being controlled by the digital output circuit, i.e. by initiating opening the switch element, in the event of, e.g. a short circuit fault.

BRIEF DESCRIPTION OF THE DRAWINGS

There now follows a brief description of embodiments of the present invention, by way of non-limiting example, with reference to the accompanying drawing appended on which:

FIG. 1 is a schematic view of a digital output circuit according to an embodiment of the invention.

DETAILED DESCRIPTION

According to an embodiment, a digital output circuit is designated generally by reference numeral 10.

The digital output circuit 10 includes a switch element 12 which is openable and closeable to selectively permit the flow of current I to an item of equipment 14, e.g. a load 16, which is in-use connected with and controlled by the digital output circuit 10. The digital output circuit 10 is also connected in use with a power supply 18 that supplies the aforementioned current I for use by the equipment item 14.

In the embodiment, the switch element 12 is a high-speed high-break contact 20 that is made up of a conventional relay contact 22, which is arranged in parallel with a semiconductor switching element in the form of an Insulated Gate Bipolar Transistor (IGBT) 23. Other forms of semiconductor switching elements are also possible, such as a Field Effect Transistor (FET), as well as other types of switching elements such as an electromechanical switch.

The digital output circuit 10 also includes a current acquisition circuit 24 to measure the current I flowing through the switch element 12.

The current acquisition circuit 24 includes a current sensor 26 which, in the embodiment shown, takes the form of an impedance 28 connected in series with the switch element 12. Other types of current sensor 26 are possible, however, including, for example, isolated sensing arrangements such as a field-effect sensor, e.g. a hall-effect sensor, or a current transformer. Any current sensor that can handle direct current (DC) and has a wide frequency response so as to be able to measure rapid current transients would be suitable.

Meanwhile, the aforementioned isolated, or remote, sensing arrangements need not necessarily be integrated within the digital output circuit 10, but instead may provide a measured current $I_m$ to the digital output circuit 10.

In addition to the foregoing, the current acquisition circuit 24 also includes a conditioning module 30 to filter and amplify the measured current $I_m$ provided by the current sensor 26.

More particularly, the conditioning module 30 includes an analogue to digital converter (ADC) 32 to convert the measured current $I_m$ into individual measured current samples $I_s$. The ADC 32 converts and scales the measured current $I_m$, and the resolution and sample rate of the ADC 32 is such that there is adequate resolution, both in terms of current and time, in the resulting measured current samples $I_s$ that are utilized by further circuits within the digital output circuit 10.

In this regard, the digital output circuit 10 shown further includes both an optional primary protection circuit 34 and a condition monitoring circuit 36, each of which is arranged in communication with the current acquisition circuit 24 and, more particularly, each of which is arranged to receive respective measured current samples $I_s$ from the current acquisition circuit 24.

The primary protection circuit 34 is configured to establish a current tripping characteristic that is based on the measured current $I_m$ flowing through the switch element 12. The primary protection circuit 34 is also configured to initiate opening of the switch element 12 when the current tripping characteristic exceeds a predetermined threshold.

More particularly, the primary protection circuit 34 is configured to establish a current-squared time-based current tripping characteristic I²T (although other, e.g. arbitrary, tripping characteristics are also possible) and includes the following circuit elements to achieve this: a first buffer 38 to, in use, retain individual measured current samples $I_s$ that are provided by the current acquisition circuit 24; and an integrator 40 to sum the current samples $I_s$ retained in the first buffer 38 and provide an average of the current samples $I_s$.

In the embodiment shown, the first buffer 38 is a rotating buffer 42 which is arranged so that when a new measured current sample $I_s$ is retained therein, the oldest measured current sample $I_s$ in the buffer 42 is overwritten.

In addition, each of the measured current samples $I_s$ is squared. This can be done either by the ADC 32 (as is the case in the embodiment shown) or by the rotating buffer 42. The measured current samples $I_s$ are also obtained at a fixed rate, e.g. as determined by the sampling rate of the ADC 32, so that the average generated by the integrator 40 has a desirable current-squared time-based characteristic which in turn establishes a similarly endowed current tripping characteristic I²T.

The integrator 40 reads the contents of the rotating buffer 42 each time a new measured current sample $I_s$ is retained therein and thereafter sums the individual samples to give the integral, i.e. average, over the whole stored sequence of samples. Moreover, because the first buffer 38 is a rotating buffer 42 the average generated by the integrator 40 is a rolling average, such that current tripping characteristic I²T similarly tracks a rolling average value.

Each of the length of the first buffer 38, i.e. the length of the rotating buffer 42, and the rate at which the first buffer 38 retains individual measured current samples $I_s$, is adjustable. For example, the rate at which the first buffer 38 retains individual measured current samples $I_s$ may be adjusted by altering the sampling rate of the ADC 32.

In the foregoing manner, it is possible to manipulate the current tripping characteristic I²T according to the desired circuit-interruption characteristics of the primary protection circuit 34. For example, a fast sample rate and a short first buffer 38 will provide for fast protection, i.e. faster initiation of opening of the switch element 12, while a slow sample rate and a long first buffer 38 will provide slow protection, i.e. slower initiation of opening of the switch element 12.

The length L of the first buffer 38 in an embodiment is given by:

$$L = F_s * t_T$$

where $F_s$ is the sample rate, e.g. of the ADC 32; and $t_T$ is the tripping time, i.e. the amount of time needed to fully open the switch element 12, when it is carrying a nominal trip current $I_{nom}$.

The primary protection circuit 34 also includes a threshold comparator 44 to compare the current tripping characteristic I²T with the predetermined threshold.

The predetermined threshold T may be given by:

$$T = L * I_{nom}^2$$

where L is the length of the first buffer 38; and $I_{nom}^2$ is the square of the aforementioned nominal trip current $I_{nom}$.

In addition to the above, the primary protection circuit 34 is additionally configured to initiate closing of the switch element 12, i.e. reset the digital output circuit 10 to its normal operating configuration, when the current tripping characteristic I²T falls below the predetermined threshold.

In the meantime, the condition monitoring circuit 36 is configured to record the measured current $I_m$ flowing through the switch element 12 as the switch element closes and thereby establish a switch element closing signature, i.e. a distinctive current characteristic indicative of particular performance traits of the equipment item 14 being controlled by the digital output circuit 10.

More particularly, the condition monitoring circuit 36 is arranged in communication with a closing signature assessment unit 54, which may be a processor, such as a computer or other microprocessor, and which is in any event configured to compare the switch element closing signature with a known reference signature, and to indicate based on the comparison, e.g. when the switch element closing signature deviates to a predetermined extent from the reference signature, that there is a particular problem with the equipment item 14.

The condition monitoring circuit 36 includes a buffer, in the form of a condition buffer 46, to record the measured current $I_m$ current flowing through the switch element 12. More particularly, the condition buffer 46 is a fast buffer which records measured current samples $I_s$, i.e. as provided by the current acquisition circuit 24, during the first few milliseconds of operation of the switch element 12 following an instruction for the switch element 12 to close.

The condition buffer 46 is also configured to transmit recorded measured current samples $I_r$ to the closing signature assessment unit 54. Such transmission of the recorded measured current samples may, for example, take place when the condition buffer 46 is full.

In addition, the condition buffer 46 is also configured to empty when the switch element 12 is opened again, such that the condition buffer 46 is then able to again carry out the aforementioned condition monitoring functionality.

As well as the foregoing features mentioned above, the current acquisition circuit 24 also includes a secondary protection circuit (not shown) which is configured to initiate opening of the switch element 12 when the measured current $I_m$ flowing through the switch element 12 exceeds a specified limit, e.g. such as might arise in the event of a short circuit fault.

The digital output circuit 10 shown also includes a switch control module 48 which acts upon command signals from each of the current acquisition circuit 24 and the primary protection circuit 34 to open or close the switch element 12, as required.

The digital output circuit 10 also includes an interface module 50 which establishes communication between the digital output circuit 10 and a higher level controller 52, such as a protection relay controller or a bay control computer. The interface module 50 also sends command signals, which it receives from the higher level controller 52, to the switch control module 48 to control opening and closing of the switch element 12 during normal operation of the digital output circuit 10. In some embodiments of the invention, the higher level controller 52 may incorporate the aforementioned closing signature assessment unit 54.

In use the digital output circuit 10 operates as follows.

During normal operation of the digital output circuit 10 the switch control module 48 causes selective opening and closing of the switch element 12, i.e. the relay contact 22 and IGBT 23 therein, in response to command signals provided by the interface module 50 which, in turn, receives these from the higher level controller 52. This selective opening and closing of the switch element 12 controls the flow of current I from the current source 18 to the equipment item 14, and thereby controls operation of the equipment item 14.

Meanwhile, the current acquisition circuit 24, and more particularly the current sensor 26 therein, i.e. the series-connected impedance 28 therein, measures the flow of current I through the switch element 12.

If the level of measured current $I_m$ exceeds a specified limit the current acquisition circuit 24 sends a command signal to the switch control module 48 to initiate opening of the switch element 12. This protects both the switch element 12 and the equipment item 14 being controlled from excess current flow that might otherwise arise and cause damage to one or both of the switch element 12 and the equipment item 14.

The measured current $I_m$ provided by the current sensor 26 is passed to the conditioning module 30 of the current acquisition circuit 24 where it is filtered and amplified, before being sampled by the ADC 32 to create individual measured current samples $I_s$. The ADC 32 additionally squares the measured current samples $I_s$ ahead of sending them to the primary protection circuit 34.

The primary protection circuit 34 establishes a rolling current tripping characteristic $I^2T$ based on the measured current samples $I_s$. The primary protection circuit 34 does so by retaining respective measured current samples $I_s$ in the first buffer 38 and using the integrator 40 to sum the individual samples to give the integral, i.e. average, over the whole stored sequence of samples.

The threshold comparator 44 within the primary protection circuit 34 compares the rolling current tripping characteristic $I^2T$ with the predetermined threshold and initiates opening of the switch element 12, via a command signal sent to the switch control module 48, when the current tripping characteristic $I^2T$ exceeds the predetermined threshold (which is indicative of a fault).

In the event that the fault is transient, the primary protection circuit 34 is able to initiate closing of the switch element 12, via a further command signal sent to the switch control module 48, once the rolling current tripping characteristic $I^2T$ falls back below the predetermined threshold.

In this manner, the primary protection circuit 34 and associated switch element 12 provide a circuit-interruption functionality which is able to protect both the switch element 12, and the equipment item 14 being controlled by the digital output circuit 10, from excess current and the likely associated damage. Moreover, such circuit-interruption functionality can be cancelled, i.e. removed, in the event that the associated fault is of a transient nature.

In the meantime, the squared measured current samples $I_s$ generated by the ADC 32 are sent also to the condition monitoring circuit 36.

The condition buffer 46 of the condition monitoring circuit 36 begins to record a sequence of such squared measured current samples $I_s$ when a command signal initiating closure of the switch element 12 is generated and thereby establishes a switch element closing signature.

This closing signature is transmitted by the condition buffer 46 to the closing signature assessment unit 54, which may or may not form a part of the higher level controller 52. In any event, the closing signature assessment unit 54 compares the closing signature with a reference signature and identifies a problem with the operation of the equipment item 14 being controlled by the digital output circuit 10 if the closing signature deviates to a predetermined extent from the reference signature.

When the switch element 12 opens again, the condition buffer 46 empties.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A digital output circuit, for controlling an item of equipment within a power distribution network, comprising:
    a switch element configured to open and close thereby selectively permitting the flow of current to an item of equipment being controlled in use by the digital output circuit;
    a current acquisition circuit configured to measure the current flowing through the switch element; and
    a condition monitoring circuit arranged in communication with the current acquisition circuit, wherein the condition monitoring circuit is configured to record the measured current flowing through the switch element as the switch element closes and, thereby establishing a switch element closing signature, wherein the condition monitoring circuit is arranged in communication additionally with a closing signature assessment unit configured to compare the switch element closing signature with a known reference signature and to indicate based on the comparison when there is a particular problem with the equipment item.

2. The digital output circuit of claim 1, wherein the switch element closing signature is configured to indicate particular performance traits of the equipment item being controlled, thereby permitting the identification of a problem with the equipment item.

3. The digital output circuit of claim 1, wherein the closing signature assessment unit is configured to indicate that there is a particular problem with the equipment item when the switch element closing signature deviates to a predetermined extent from the reference signature.

4. The digital output of claim 3, wherein the condition monitoring circuit comprises a buffer to record the measured current flowing through the switch element.

5. The digital output circuit of claim 4, wherein the buffer is configured to transmit recorded measured current samples to the closing signature assessment unit.

6. The digital output circuit of claim 4, wherein the buffer empties when the switch element opens.

7. The digital output circuit of claim 1, wherein the current acquisition circuit comprises a current sensor.

8. The digital output circuit of claim 7, wherein the current acquisition circuit further comprises a conditioning module to filter and amplify measured current provided by the current sensor.

9. The digital output circuit of claim 8, wherein the conditioning module comprises an analogue to digital converter configured to convert the measured current into individual measured current samples.

10. The digital output circuit of claim 1, wherein the current acquisition circuit comprises a secondary protection circuit configured to initiate the opening of the switch element when the measured current flowing through the switch element exceeds a specified limit.

* * * * *